(12) United States Patent
Liou

(10) Patent No.: US 6,292,299 B1
(45) Date of Patent: Sep. 18, 2001

(54) TUNABLE OPTICAL ADD/DROP DEVICE AND METHOD

(75) Inventor: Kang-Yih Liou, Holmdel, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/503,515

(22) Filed: Feb. 14, 2000

(51) Int. Cl.$^7$ .................................................. G02B 5/28
(52) U.S. Cl. ......................... 359/583; 359/589; 359/578
(58) Field of Search .................................. 359/578, 579, 359/584, 585, 589, 583

(56) References Cited

U.S. PATENT DOCUMENTS

| | | | |
|---|---|---|---|
| 5,506,920 | 4/1996 | Suemura | 385/25 |
| 5,781,332 | 7/1998 | Ogata | 359/308 |
| 5,781,341 | 7/1998 | Lee | 359/578 |
| 5,872,655 | 2/1999 | Seddon | 359/588 |
| 5,892,612 | 4/1999 | Miller | 359/250 |
| 6,115,178 | * 9/2000 | Naganuma et al. | 359/583 |

OTHER PUBLICATIONS

Alessandro Iocco, et al.; "Fast and Widely Tunable Bragg Grating Reflection Filter"; OFC '99, pp. 132–134.
S. Jin, et al.; "Magnetically Tunable Fiber Bragg Gratings"; OFC '99, pp. 135–137.
H.A. Macleod; "Thin–Film Optical Filters"; 1989; Chapter 5—Multilayer High–Reflectance Coatings.
N. Mekada; "Polarization Independent, Linear–Tuned Interference Filter With Constant Transmission Characteristics Over 1530–1570 nm Tuning Range"; IEEE Photonics Technology Letters, vol. 9, No. 6, Jun. 1997.
Yoshihiko Suemura, "A Newly Developed Adaptive Wavelength Tunable Filter For Wavelength Selective Optical Communications Systems"; 19$^{th}$ European Conference on Optical Communication Proceedings, vol. 2, 1993.
T. Eftimov, et al., "8–Channel Tunable Drop Device With Thermal Tuning for 100 GHz Channel Spacing"; 24$^{th}$ European Conference on Optical Communication, Sep. 20–24, 1998, Madrid, Spain.
OCLI—Preliminary Product Specification; "100 GHz Coplanar Translation Filter Switch", Jan. 11, 1998.
Santec Products Guide 1999—http://www.santec.com—Sep. 24, 1999.
1998 Santec Component Series.

* cited by examiner

Primary Examiner—Jon Henry
(74) Attorney, Agent, or Firm—Guy H. Eriksen; Gregory J. Murgia

(57) ABSTRACT

Data loss is reduced and bandwidth efficiency improved while tuning an optical add/drop device comprising a hitless wavelength-tunable optical filter. The hitless wavelength-tunable optical filter includes a broadband reflective surface and a tunable filter surface, the reflective surface and filter surface positioned adjacent to each other. Hitless tuning of the device is accomplished by changing the point at which an optical beam strikes the filter surface along a constant wavelength channel track whenever the beam is incident to the filter surface region. Realignment to a position associated with a new wavelength channel track is performed with the optical beam incident to the reflective surface region. Repositioning the optical beam to the filter region occurs at a location corresponding to the new wavelength to be added/dropped and subsequent optical beam realignment within the filter region is along the new wavelength channel track.

34 Claims, 4 Drawing Sheets

TUNABLE OPTICAL ADD/DROP DEVICE AND METHOD

FIELD OF THE INVENTION

The present invention relates to optical filters, and more particularly to wavelength-tunable optical filters and their use within WDM add/drop devices.

BACKGROUND OF THE INVENTION

Optical fiber is becoming the transmission medium of choice for many communication networks because of the speed and bandwidth advantages associated with optical transmission. In addition, wavelength division multiplexing (WDM) is being used to meet the increasing demands for higher data rates and more bandwidth in optical transmission applications.

In its simplest form, WDM is a technique whereby parallel data streams of modulated light at different wavelengths are coupled simultaneously into the same optical fiber. As such, a WDM signal is typically viewed as a composite optical signal comprised of a plurality of optical wavelength channels sharing a single transmission medium, each wavelength channel having a different wavelength of light. Although each wavelength channel actually includes a range of wavelengths, it is common to refer to an optical wavelength channel in terms of its center wavelength.

It is often necessary to add or remove a particular wavelength channel at various points along an optical fiber transmission path, without disturbing or disrupting the remaining wavelength channels, whether the optical transmission system is a long haul, metropolitan, or local. Adding or removing a wavelength channel is accomplished utilizing add/drop devices. An add/drop device typically utilizes a bandpass filter, that is, an optical filter that is transmissive with respect to one or more wavelength channels and reflective with respect to the remaining wavelength channels, to add or remove the desired wavelength channel. The remainder of the wavelength channels not within the passband of the filter, remain unaffected by the device, and the transmission of their respective modulated light data streams is unimpeded.

In recent years, tunable filters have been developed which, when incorporated as the optical filter in an add/drop device, enable the device to be dynamically tuned to add or remove a desired optical wavelength channel from the plurality of wavelength channels. If desired to change the added or dropped wavelength channel, it is easily accomplished without having to replace the filter element (or the entire add/drop device) with another having the desired bandpass characteristics. This is typically accomplished by repositioning the filter with respect to an incident optical beam. However, one unfortunate aspect resulting from dynamically tuning an add/drop device is that intermediate wavelength channels, those channels having wavelengths existing between that of the initially tuned channel and that of the finally tuned channel, will each sequentially exhibit a temporary loss of signal continuity as the filter is tuned to each respective channel's wavelength. This occurs because the point of incidence of the optical beam upon the filter, in transitioning from a point corresponding to the initially tuned channel to a point corresponding to the finally tuned channel, passes filter locations corresponding to each of the intermediate channels. When the composite optical signal light strikes filter locations corresponding to intermediate wavelength channels, intermittent data loss from those intermediate wavelength channels results. Such an intermittent loss of data is often referred to as a so-called "hit." The deleterious effects of a data hit, to the devices for which the data is intended to be transmitted, are well known. Devices exposed to such a data loss must either compensate for the loss of data, or request retransmission of the lost data. Ultimately, such data loss results in diminished quality of service, decreased bandwidth efficiency, or both.

SUMMARY OF THE INVENTION

Data loss is reduced and bandwidth efficiency improved while tuning an optical add/drop device comprising a hitless wavelength-tunable optical filter. The hitless wavelength-tunable optical filter includes a broadband reflective region and a tunable filter region. Hitless tuning of the device is accomplished by changing the point at which an optical beam is incident upon the filter region along a constant wavelength channel track whenever the beam is strikes the device in the filter region. Realignment to a position associated with a new wavelength channel track is performed when the optical beam is incident upon the broadband reflective region. Repositioning the optical beam to the filter region occurs at a location corresponding to the new wavelength to be added/dropped and subsequent optical beam realignment within the filter region is along the new wavelength channel track.

BRIEF DESCRIPTION OF THE DRAWINGS

A more complete understanding of the present invention may be obtained from consideration of the following description in conjunction with the drawings in which.

DETAILED DESCRIPTION

Figure 1:
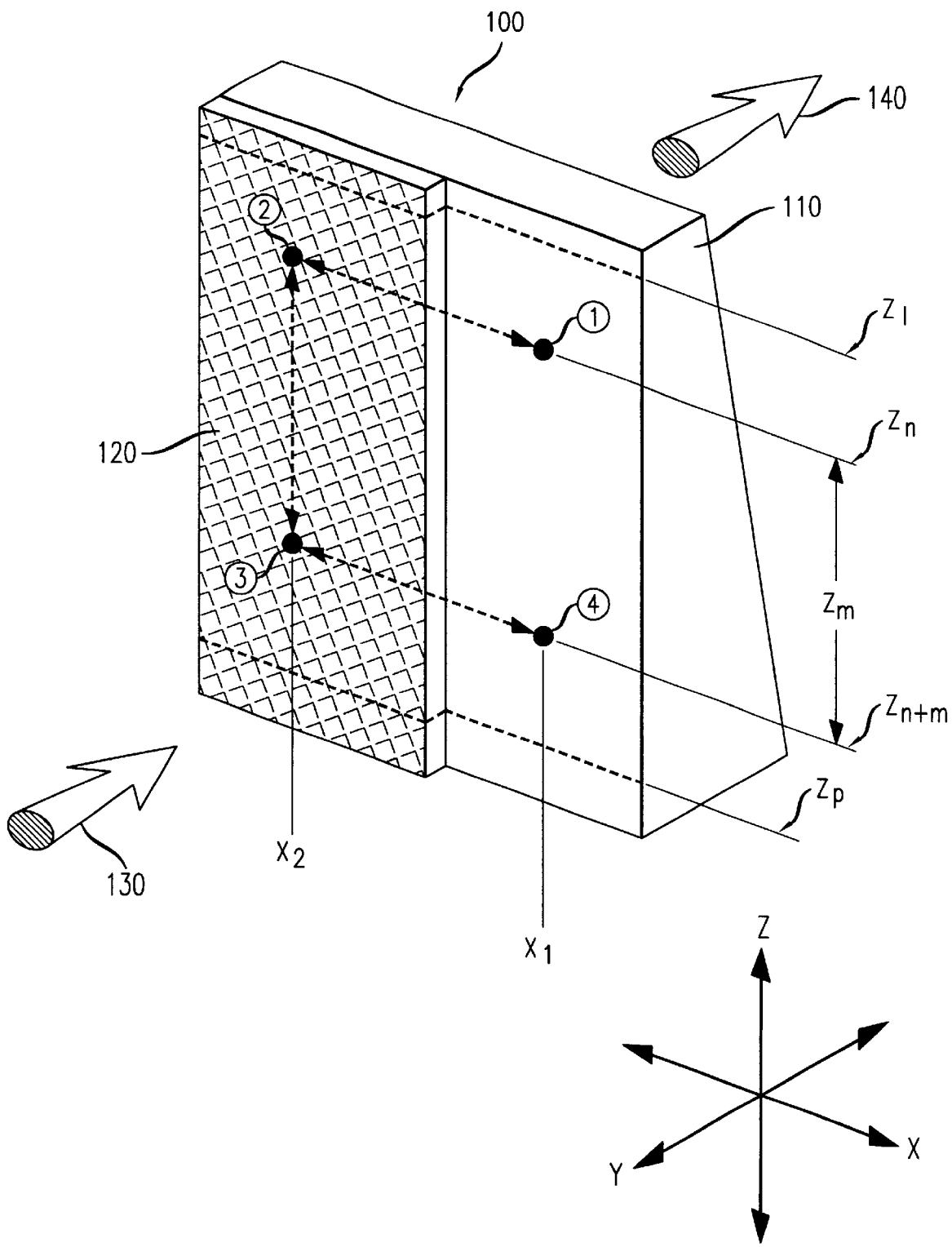
FIG. 1 shows a wavelength-tunable optical wedge filter with broadband optical reflector, in accordance with the principles of the present invention.

FIG. 1 is an illustration of a hitless wavelength-tunable optical filter 100, incorporating the principles of the present invention. The hitless wavelength-tunable optical filter 100 is comprised of two regions. The first region is comprised of a wavelength-tunable optical filter 110. The second region, adjacent to the first region, is comprised of a broadband optical reflector 120.

The wavelength-tunable optical filter (also referred to as the filter region) 110 illustrated in the instant exemplary embodiment is a multi-layer dielectric wedge filter, although it would be apparent to those skilled in the art that any number of other types of wavelength-tunable optical filters may also be utilized and not depart from the principles of the present invention. By way of example, other filters that may be used include, but are not limited to, tunable Mach-Zehnder interferometers, acoustic tuning filters, tunable thin film interference filters, tunable Fabry-Perot etalons, tunable Fabry-Perot interferometers. It is even contemplated that a plurality of discrete non-tunable filters, each having a bandpass corresponding to a unique wavelength channel, may be ganged together to form the filter region 110, and placed such that each of the ganged filters is adjacent to the broadband optical reflector 120, and still fall within the principles of the present invention.

The broadband optical reflector (also referred to as the broadband reflective region) 120 utilized in one exemplary embodiment of the present invention is a thin broadband reflective metallic; coating, such as gold or silver, disposed over a portion of the filter region 110; although it would be apparent to those skilled in the art that any number of other broadband reflective devices and means for providing a broadband reflective surface may also be used and still fall within the principles of the present invention. Such other devices and means include, but are not limited to, discrete metallic or dielectric broadband reflector units adapted to fit adjacent to and abut the filter region 110. Furthermore, although the broadband reflector 120 is illustrated as being implemented on the front side of the filter (the side of the filter struck by an incident optical beam), it may also be implemented on the back side of the filter (the side of the filter in which a wavelength specific channel beam is filtered from the composite optical beam). Those skilled in the art would also appreciate that filter performance may be optimized by applying phase matching techniques so that wavelengths of light reflected from the filter region 110 and wavelengths of light reflected from the broadband reflective region 120 are phase matched.

The following is a brief description of the operation of the hitless wavelength-tunable optical filter 100, and comparison to the operation of a prior art wavelength-tunable filter. Assume that the hitless wavelength-tunable optical filter 100 is included as a component of an add/drop device incorporated within a WDM system having a total of p wavelength channels included within the incident composite optical signal beam 130. The optical signal beam of a single wavelength channel 140 is shown passing the filter region 110 region, whenever the incident composite optical signal beam 130 strikes the filter region 110. The reflected composite optical signal is not shown. Transition between functionality of the hitless wavelength-tunable optical filter 100 as a bandpass filter and as a broadband reflector is accomplished by changing the point at which the incident composite optical signal beam 130 strikes the device with respect to the x-axis. When positioned to strike the hitless wavelength-tunable optical filter 100 in the filter region 110, for example, along x coordinate $x_1$, the device operates as a bandpass filter. However, when positioned to strike the hitless wavelength-tunable optical filter 100 in the broadband reflective region 120, for example, along x coordinate $x_2$, the device operates as a reflective coupler. When the incident composite optical signal beam 130 is positioned to strike the filter region 110, the wavelength channel which the device will transmit is determined by the relative z-coordinate at which the incident composite optical signal beam 130 strikes the filter region 110. For example, if the incident composite optical signal beam 130 strikes the filter region 110 at matchpoint ①, ordered pair $(x_1, z_n)$, then the device will transmit the $n^{th}$ wavelength channel through the filter region 110 and reflect all other wavelength channels. However, if the incident composite optical signal beam 130 strikes the filter region 110 at matchpoint ④, ordered pair $(X_1, Z_{(n+m)})$, then the device will transmit the $(n+m)^{th}$ wavelength channel through the filter region 110 and reflect all other wavelength channels.

When utilized as a drop device, the incident composite optical signal 130 is comprised of p wavelength channels and the reflected optical signal is comprised of (p–1) wavelength channels, the wavelength channel dropped being the single wavelength channel 140 being transmitted through the filter region 110. When utilized as an add device, the incident composite optical signal 130 is comprised of (p–1) wavelength channels and the reflected optical signal is comprised of p wavelength channels, the wavelength channel added being the single wavelength channel 140 being transmitted through the filter region 110 (albeit in a direction opposite that illustrated).

Further assume that the incident composite optical signal beam 130 is initially positioned to strike the filter region 110 at matchpoint ①, thereby transmitting the $n^{th}$ wavelength channel as a dropped channel; and that it is desired to change the pass band so that the $(n+m)^{th}$ wavelength channel is dropped instead. Thus, either the incident composite optical signal beam 130 must be repositioned, or the filter itself repositioned, to enable the incident composite optical signal beam 130 to strike the filter region 110 at matchpoint ④. Prior art tunable filters have only a filter region, with no broadband reflective region; therefore, tuning is accomplished completely in a region of active filtering (in effect, the equivalent of transitioning from matchpoint ① to matchpoint ④ completely along the x coordinate $x_1$ in the instant device). Thus, when a prior art filter is utilized in a WDM add/drop device and the device is tuned from the $n^{th}$ wavelength channel to the $(n+m)^{th}$ wavelength channel, each of the intermediate wavelength channels (that is, wavelength channels [n+1], [n+2], [n+3], . . . , [n+m–2], and [n+m–1]) experiences an intermittent loss of data, or a data hit.

Figure 2:
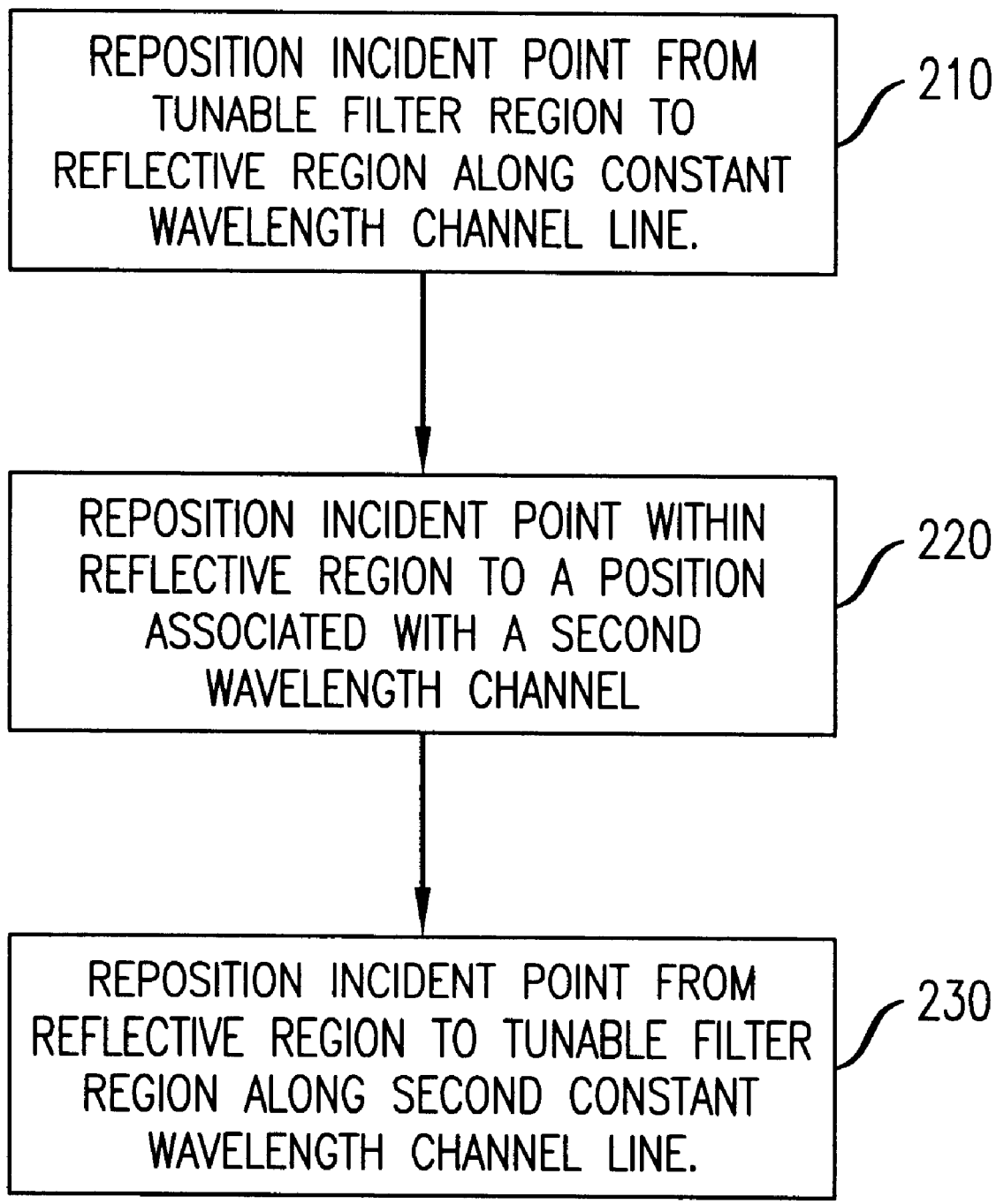
FIG. 2 is a flow chart of an exemplary process for the hitless tuning of a wavelength-tunable optical filter, in accordance with the principles of the present invention.

In contrast, and in accordance with the principles of the present invention as illustrated in FIG. 2, the hitless wavelength-tunable optical filter 100 operates as follows in changing the selected pass band of the filter region 110 from the $n^{th}$ wavelength channel to the $(n+m)^{th}$ wavelength channel. In accordance with step 210, the incident point, the relative point at which the incident composite optical signal beam 130 strikes the filter region 110, is repositioned from the filter region 110 to the broadband reflective region 120 along a constant wavelength channel track, a line in the instant embodiment, from matchpoint ① to matchpoint ②. The constant wavelength channel track is a plot of points along the filter region 110 having constant bandpass characteristics; that is, passing the same wavelength channel at all points. The constant wavelength channel track from matchpoint ① to matchpoint ② is along the z-coordinate $z_n$, and corresponds to the $n^{th}$ wavelength channel. Once optical signal beam 130 strikes the hitless wavelength-tunable optical filter 100 in the broadband reflective region 120, all wavelength channels are reflected and none are transmitted, regardless of the precise point of incidence within the region. Therefore, repositioning of the incident point within the region may occur without affecting optical and system performance.

In accordance with step 220, the incident point is repositioned within the broadband reflective region 120 to a position associated with a constant wavelength channel track for the wavelength channel to which the filter is to be tuned, the $(n+m)^{th}$ wavelength channel in the instant example. Repositioning may follow any path so long as the incident point remains contained within the broadband reflective region 120. In this illustrative example, repositioning is from matchpoint ② to matchpoint ③ along the x-coordinate $x_2$. Matchpoint ③ is defined by the ordered pair $(x_2, z_{n+m})$.

In accordance with step 230, the incident point is repositioned from the on broadband reflective region 120 to the filter region 110 along a constant wavelength channel track, from matchpoint ③ to matchpoint ④. The constant wavelength channel track from matchpoint ③ to matchpoint ④ is along the z-coordinate $Z_{n+m}$, and corresponds to the $(n+m)^{th}$ wavelength channel. Once optical signal beam 130 strikes the device within the filter region 110, the $(n+m)^{th}$ wavelength channel is transmitted and all other wavelength channels are reflected. It would be understood by those skilled in the art that each of the previously recited repositioning steps may be accomplished by altering the location at which an incident composite optical signal beam 130 strikes the hitless wavelength-tunable optical filter 100, through whatever means utilized, including: (i) repositioning said hitless wavelength-tunable optical filter 100 with respect to a fixed incident composite optical signal beam 130, (ii) repositioning the incident composite optical signal beam 130 with respect to a fixed hitless wavelength-tunable optical filter 100, or (iii) repositioning both the incident composite optical signal beam 130 and the fixed hitless wavelength-tunable optical filter 100.

Figure 3:
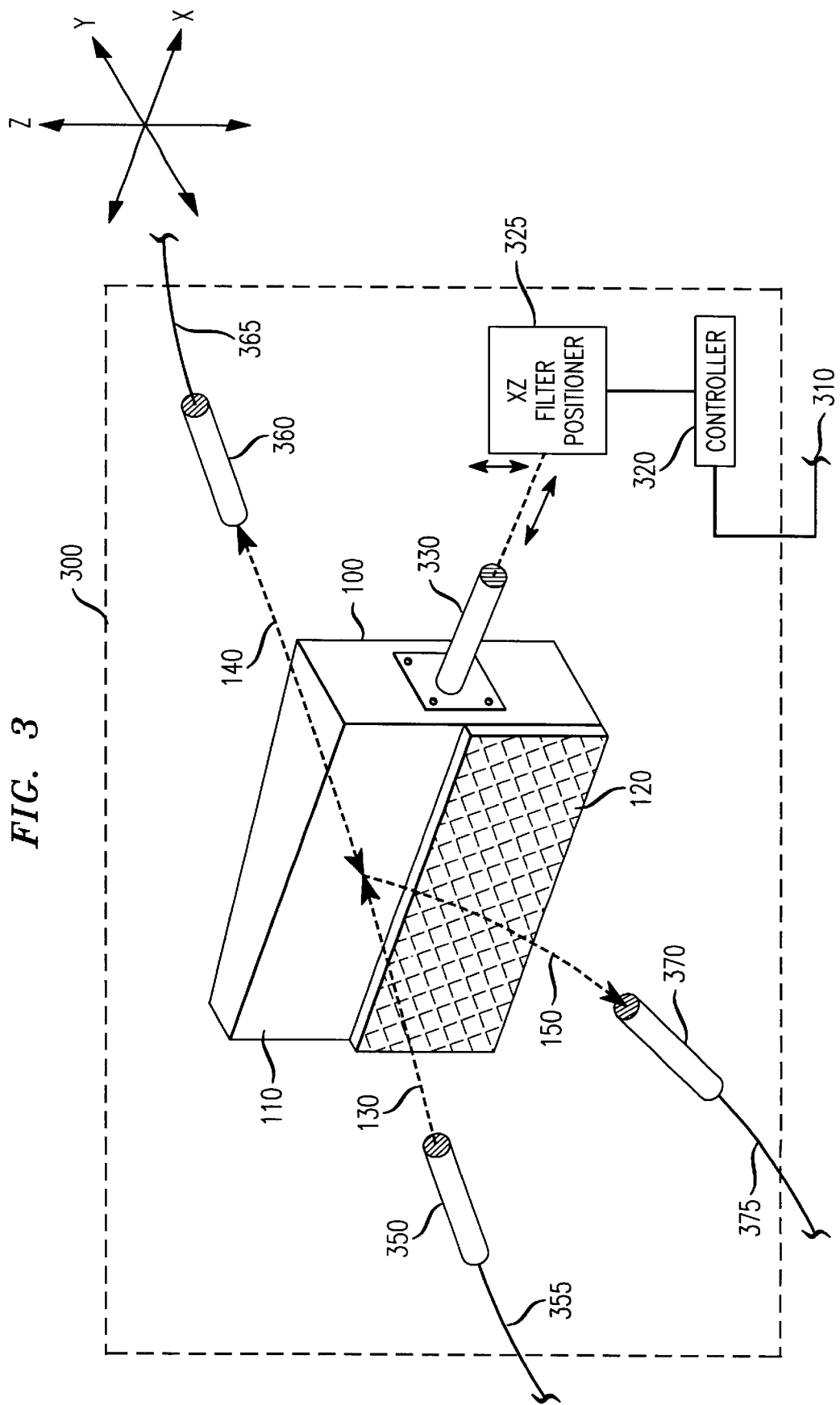
FIG. 3 is a block diagram showing an add/drop device incorporating a wavelength-tunable optical wedge filter with broadband optical reflector, in accordance with the principles of the present invention.
Figure 4:
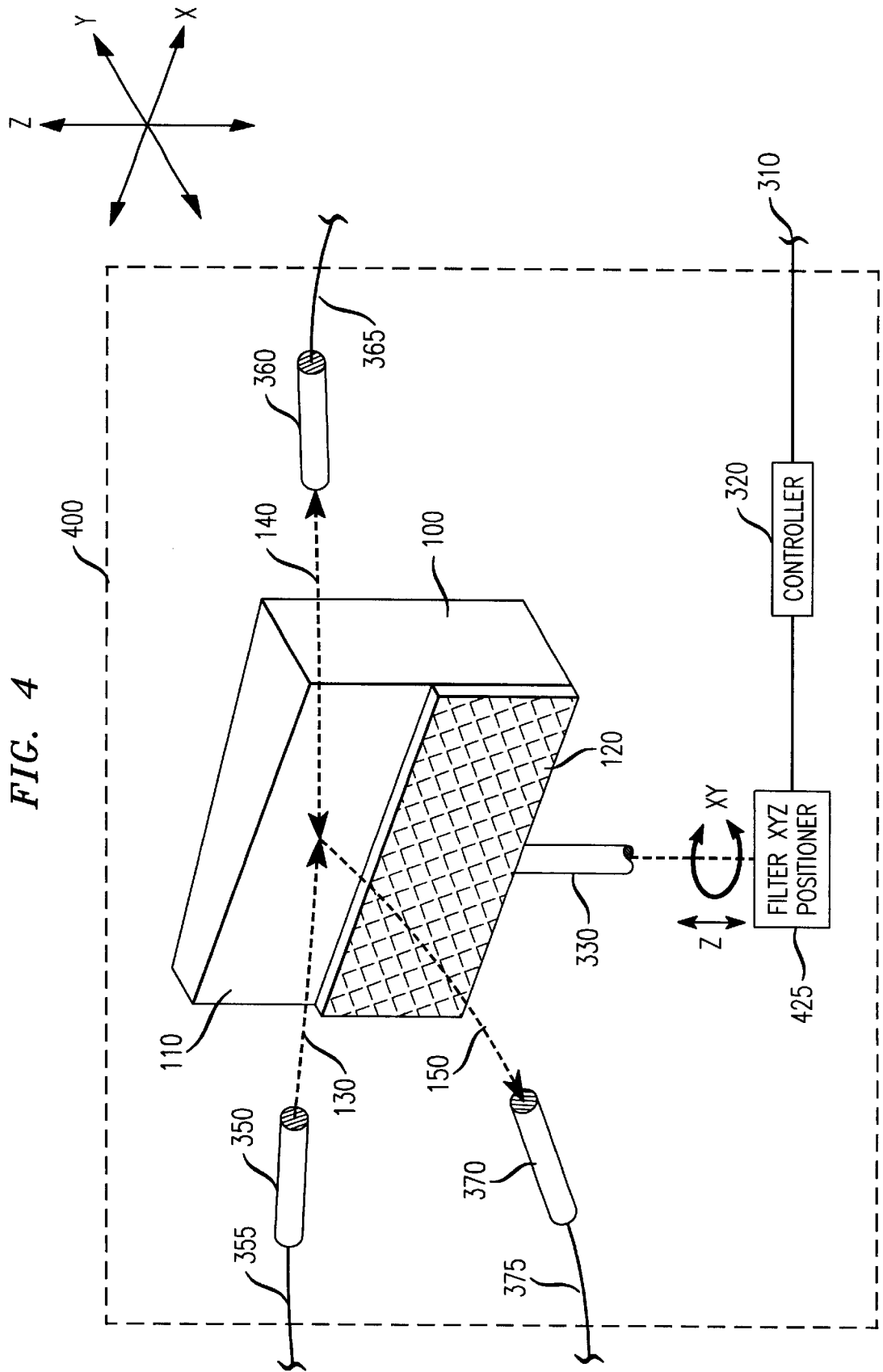
FIG. 4 is a block diagram showing an acid/drop device incorporating a wavelength-tunable Fabry-Perot filter with broadband optical reflector, in accordance with the principles of the present invention.

FIGS. 3 and 4 illustrate two embodiments of the hitless wavelength-tunable optical filter incorporated within a WDM add/drop device. FIG. 3 is a diagram of the add/drop device 300 in which the filter type used is a multi-layer tunable dielectric filter and the filter is positioned using well-known lateral slide tuning of a wedge filter to select a particular wavelength channel for add/drop. FIG. 4 is a diagram of the add/drop device 400 in which the filter type used is a Fabry-Perot interference filter and the filter is positioned using well-known rotational tuning to select a particular wavelength channel for add/drop. It is noted that the pass band selected for transmission through the filter region 110 of the device is determined by the angle of incidence of the incident composite optical signal beam 130, thus a rotational tuning scheme is used. It would be apparent to those skilled in the art that other filter means and types may also be utilized and still embody the principles of the present invention, including, but not limited to, and tunable Mach-Zehnder interferometers, to name a few. Furthermore, it would be apparent to those skilled in the art that other tuning means could also be utilized and still embody the principles of the present invention, including, but not limited to, piezoelectric actuation tuning, manual tuning, synchro/servo tuning, mechanical ratchet tuning, to name a few.

Referring now to FIG. 3, an optical beam collimator 350 is coupled to an optical fiber 355 as a means for providing the incident composite optical signal beam 130 to be imparted upon the hitless wavelength-tunable optical filter 100. An optical beam collimator 360 is coupled to an optical fiber 365 for providing the transmitted wavelength channel optical signal beam 140 for adding/dropping through the hitless wavelength-tunable optical filter 100. An optical beam collimator 370 is coupled to an optical fiber 375 for providing the reflected composite optical signal beam 150 from the hitless wavelength-tunable optical filter 100. A positioning coupler 330 is utilized to couple the hitless wavelength-tunable optical filter 100 to a filter positioner.

With respect to the multi-layer tunable dielectric filter utilized in FIG. 3, an XZ positioner 325 is used, since positioning with only two degrees of freedom is required. Device positioning along the x-axis changes the point of incidence at which the optical signal beams strike the surface of the filter region 110 and therefore the wavelength channel which is transmitted through the device is changed. Device positioning along the z-axis changes the point of incidence of the optical signal beam from between the filter region 110 and the broadband reflective region 120, and therefore determines whether the filter is active and passing a wavelength channel, or the broadband reflective region is active and reflecting the entire incident composite optical signal beam.

With respect to the Fabry-Perot interference filter utilized in FIG. 4, operation is similar to that described in conjunction with FIG. 3, with the exception that an XYZ positioner 425 is utilized, since three degrees of freedom are used. Rotation in the XY-plane is utilized to change the angle of incidence with which the optical signal beams strike the surface of the filter region 110 and therefore changes the wavelength channel which is transmitted through the device. Device positioning along the z-axis changes the point of incidence of the optical signal beam between the filter region 110 and the broadband reflective region 120, and therefore determines whether the filter is active and passing a wavelength channel, or the broadband reflective region is active and reflecting the entire incident composite optical signal beam.

Regardless of whether the XZ positioner 325 or the XYZ positioner 425 is used, directions for the control and positioning of the device are processed through a controller 320 adapted to receive controller input signals 310 containing instructions as to the wavelength channel to be added or dropped. The controller 320 accepts the controller input signals 320 and responds by generating position signals coupled to the positioner, and which provide the positioner with the positioning information needed to add or drop the wavelength channel desired.

The foregoing description merely illustrates the principles of the invention. It will thus be appreciated that those skilled in the art will be able to devise various arrangements which, although not explicitly described or shown herein, embody the principles of the invention and are included within its spirit and scope. For example, although the present invention is described in terms of a filter region 110 which passes a single WDM channel and which reflects other wavelength channels, the specific embodiment described is merely a simple illustrative example to teach the principles of the present invention. Those skilled in the art would realize that the principles of the present invention are equally applicable to devices in which the filter region may pass multiple wavelength channels concurrently.

Furthermore, all examples and conditional language recited are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. For example, in the add/drop devices illustrated in FIGS. 3 and 4, relative repositioning between the hitless wavelength-tunable optical filter and the optical signal beams from a set of collimators is produced using a positionable filter and a fixed set of collimators. Alternatively, it would be apparent to those skilled in the art that relative repositioning between the hitless wavelength-tunable optical filter and the optical signal beams from a set of collimators may be realized (i) utilizing a fixed filter and a positionable set of collimators, or (ii) utilizing both a positionable filter and a positionable set of collimators, and still embody the principles of the present invention.

The functions of the various illustrated or described elements, including functional blocks labeled as "controller," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included.

In the claims hereof any element expressed as a means for performing a specified function is intended to encompass any way of performing that function. The invention as defined by such claims resides in the fact that the functionalities provided by the various recited means are combined and brought together in the manner which the claims call for. Applicant thus regards any means which can provide those functionalities as equivalent as those shown herein.

What is claimed is:

1. A wavelength-tunable add/drop device comprising:
a first region operable to add or drop an optical wavelength channel selected from a plurality of optical wavelength channels;
a second region, adjacent to said first region, said second region operable as a broadband optical reflector; and
means for selectively repositioning an optical signal beam between selected positions within the first region and selected positions within the second region such that the optical signal beam is incident upon the first region while adding or dropping an optical wavelength channel and is incident upon the second region while tuning to a different optical wavelength channel.

2. The add/drop device of claim 1 wherein said second region includes a metallic coating to function as said broadband optical reflector.

3. The add/drop device of claim 2 wherein said metallic coating is comprised of gold.

4. The add/drop device of claim 2 wherein said metallic coating is comprised of silver.

5. The add/drop device of claim 1 wherein said second region is comprised of at least one reflective dielectric layer.

6. The add/drop device of claim 1 wherein said first region is comprised of a tunable optical filter.

7. A wavelength-tunable add/drop device comprising:
a first region operable to add or drop a optical wavelength channel selected from a plurality of optical wavelength channels; and
a second region, adjacent to said first region, said second region operable as a broadband optical reflector,
wherein said first region comprises a tunable optical filter and wherein tuning of said tunable optical filter is accomplished using slide tuning.

8. The add/drop device of claim 7 wherein said slide tuning is accomplished using relative repositioning between said tunable optical filter and a set of collimators.

9. The add/drop device of claim 8 wherein said relative repositioning is accomplished using a fixed set of collimators and a positionable tunable optical filter.

10. The add/drop device of claim 8 wherein said relative repositioning is accomplished using a fixed tunable optical filter and a positionable set of collimators.

11. The add/drop device of claim 6 wherein said tunable optical filter is a Fabry-Perot filter.

12. A wavelength-tunable add/drop device comprising:
a first region operable to add or drop a optical wavelength channel selected from a plurality of optical wavelength channels; and
a second region, adjacent to said first region, said second region operable as a broadband optical reflector,
wherein said first region comprises a tunable optical filter and wherein tuning of said tunable optical filter is accomplished using rotational tuning.

13. The add/drop device of claim 12 wherein said rotational tuning is accomplished using relative repositioning between said tunable optical filter and a set of collimators.

14. The add/drop device of claim 13 wherein said relative repositioning is accomplished using a fixed set of collimators and a positionable tunable optical filter.

15. The add/drop device of claim 13 wherein said relative repositioning is accomplished using a fixed tunable optical filter and a positionable set of collimators.

16. A method for the tuning of a wavelength-tunable optical filter from a first wavelength channel to a second wavelength channel, the method comprising the steps of:
repositioning an optical signal beam along a first wavelength channel track on said wavelength-tunable optical filter to a region of broadband reflectance;
repositioning said optical signal beam within said region of broadband reflectance to a position associated with said second wavelength channel; and
repositioning said optical signal beam from said region of broadband reflectance along a second wavelength channel track on said wavelength-tunable optical filter.

17. The method of claim 16 wherein the steps of repositioning are accomplished by moving said wavelength-tunable optical filter.

18. The method of claim 16 wherein the steps of repositioning are accomplished by moving said optical signal beam.

19. The method of claim 16 wherein at least one of the steps of repositioning is accomplished by rotation of said wavelength-tunable optical filter.

20. The method of claim 16 wherein at least one of the steps of repositioning is accomplished by laterally moving said wavelength-tunable optical filter.

21. A wavelength-tunable optical device comprising:
a broadband reflective surface;
a wavelength-tunable optical filter adjacent to said broadband reflective surface, said wavelength-tunable optical filter operable to add or drop an optical wavelength channel selected from a plurality of optical wavelength channels; and
means for selectively repositioning an optical signal beam between selected positions on the wavelength-tunable optical filter and selected positions on the broadband reflective surface such that the optical signal beam is incident upon the wavelength-tunable optical filter while adding or dropping an optical wavelength channel and is incident upon the broadband reflective surface while tuning to a different optical wavelength channel.

22. The device of claim 21 further comprising:
an incident optical beam collimator for selectively imparting an incident optical signal beam on either said broadband reflective surface or said wavelength-tunable optical filter.

23. The device of claim 22 further comprising:
a reflected optical beam collimator for selectively collecting a reflected optical signal beam from either said broadband reflective surface or said wavelength-tunable optical filter.

24. The device of claim 23 further comprising:
a transmit optical beam collimator for adding or dropping a wavelength channel through said wavelength-tunable optical filter.

25. The device of claim 21 wherein said broadband reflective surface is a metallic coating.

26. The device of claim 25 wherein said metallic coating is gold.

27. The device of claim 25 wherein said metallic coating is silver.

28. The device of claim 21 wherein said broadband reflective surface is comprised of at least one reflective dielectric layer.

29. The device of claim 21 wherein said wavelength-tunable optical filter is a wedge-shaped thin film filter.

30. A wavelength-tunable optical device comprising:
a broadband reflective surface; and
a wavelength-tunable optical filter adjacent to said broadband reflective surface,
wherein said wavelength-tunable optical filter is a Fabry-Perot filter.

31. A method for the tuning of a wavelength-tunable optical filter from a first wavelength channel to a second wavelength channel, the method comprising:
repositioning an optical signal beam from a position on said filter corresponding to said first wavelength channel, into a region of broadband reflectance; while maintaining an optical bandpass for a signal associated with said first wavelength channel until said optical signal beam is repositioned into said region of broadband reflectance;
repositioning said optical signal beam to a position within said region of broadband reflectance so that when said optical signal beam is returned to said filter, an optical bandpass for a signal associated with said second wavelength channel is established; and
repositioning said optical signal beam from said region of broadband reflectance to a position on said filter corresponding to said second wavelength channel; while maintaining said optical bandpass for said signal associated with said second wavelength channel.

32. A hitless wavelength-tunable optical add/drop device comprising:
means for repositioning an optical signal beam from a position on a wavelength-tunable filter corresponding to a first wavelength channel, into a region of broadband reflectance; while maintaining a first optical bandpass for a signal associated with said first wavelength channel until said optical signal beam is repositioned into said region of broadband reflectance;
means for repositioning said optical signal beam to a position within said region of broadband reflectance so that when said optical signal beam is returned to said wavelength-tunable filter, a second optical bandpass for a signal associated with a second wavelength channel is established; and
means for repositioning said optical signal beam from said region of broadband reflectance to a position on said wavelength-tunable filter corresponding to said second wavelength channel; while maintaining said second optical bandpass for said signal associated with said second wavelength channel.

33. The wavelength-tunable add/drop device according to claim 1, wherein the means for selectively repositioning is operable to reposition an optical signal beam from a position within the first region along a first wavelength channel track corresponding to a first optical wavelength channel to a position within the second region, and is further operable to reposition the optical signal beam within the second region to a second wavelength channel track corresponding to a second optical wavelength channel, and is further operable to reposition the optical signal beam from the second region to a position within the first region along the second wavelength channel track.

34. The wavelength-tunable optical device according to claim 21, wherein the means for selectively repositioning is operable to reposition an optical signal beam from a position on the wavelength-tunable optical filter along a first track corresponding to a first optical wavelength channel to a position on the broadband reflective surface, and is further operable to reposition the optical signal beam within the broadband reflective surface to a second track corresponding to a second optical wavelength channel, and is further operable to reposition the optical signal beam from the broadband reflective surface to a position on the wavelength-tunable optical filter along the second track.

\* \* \* \* \*